United States Patent Office 2,770,633
Patented Nov. 13, 1956

2,770,633

ORGANOSILICON ESTERS

Leo H. Sommer, State College, Pa., assignor to Dow Corning Corporation, Midland, Mich., a corporation of Michigan No Drawing. Application October 28, 1953,
Serial No. 388,919

8 Claims. (Cl. 260—448.2)

This invention relates to ester-ended organo-siloxanes.
The object of this invention is to prepare novel modified polysiloxanes having ester functional groups on the ends of the chain. Another object is to prepare modified methyl polysiloxanes which have improved lubricating properties.

This invention relates to compositions of the formula

in which R is a monovalent hydrocarbon radical, $n$ is an integer from 3 to 18 inclusive and $m$ has a value of at least zero.

The compounds of this invention in which $m$ is zero (i. e., the disiloxanes) are best prepared by the general reaction

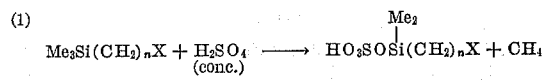

In the above equation X is a halogen and M is a metal. Preferably the alkali metal salts of the organo acids and the bromides of the siloxanes are employed.

The dibromodisiloxanes supra are best prepared in the following manner:

(1)
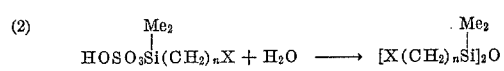

(2)

This reaction proceeds smoothly at room temperature to give quantitative yields of the desired product.

The halo alkyl trimethylsilanes supra may be prepared by various methods. One method is that of reacting the corresponding trimethylsilyl alcohols with phosphorus halides. A second and more general method is that of preparing a mono-Grignard of dihalides of the formula $X(CH_2)_nX$ and thereafter reacting the mono-Grignard with trimethylchlorosilane. This method is particularly applicable to those compounds in which $n$ has a value of 5 or greater.

For the purpose of this invention R can be any monovalent hydrocarbon radical. Specific examples of such radicals which are included within the scope of this invention are alkyl radicals such as methyl, ethyl, propyl, 2-ethylhexyl, and octadecyl; cyclo aliphatic radicals such as cyclohexyl and cyclopentyl; alkylene radicals such as vinyl and allyl and aromatic hydrocarbon radicals such as phenyl, tolyl, napthyl and xenyl.

The siloxanes of this invention in which $m$ has a value of 1 or more are prepared by copolymerizing the corresponding disiloxane with dimethylpolysiloxane cyclics in the presence of an acid catalyst. This copolymerization proceeds in the normal manner by means of siloxane bond rearrangement. The resulting products are fluids of varying viscosities depending upon the value of $m$, which can have a value in excess of 10,000. The viscosity of the final product is readily controlled by varying the molar ratio of the disiloxane and the dimethyl siloxane cyclics. The smaller the amount of disiloxane used relative to the amount of dimethylsiloxane, the greater will be the value of $m$.

The compounds of this invention are useful as lubricants.

The following examples are illustrative only and should not be construed as limiting the invention which is properly set forth in the appended claims.

Example 1

48.5 g. of gamma-bromopropyl trimethylsilane was added dropwise over a period of 20 minutes to 200 g. of concentrated sulphuric acid which had been cooled to about 1° C. The mixture was then allowed to warm to 18° C. and stirred vigorously at that temperature overnight. 94% of the theoretical amount of methane was evolved.

The mixture was then poured onto cracked ice. The organic layer was separated, washed with dilute sodium bicarbonate solution and dried over anhydrous potassium carbonate. The product was then filtered and distilled to give bis-(gamma-bromopropyl)tetramethyldisiloxane having the following properties: B. P. 111–112° C. at .3 mm., $d^{20}$ 1.281 and MR$_D$ 82.71. Upon analysis the material was found to contain 42.35% bromine and 15% silicon.

Example 2

47 g. of bis-(gamma-bromopropyl)tetramethyldisiloxane, 29.4 g. of anhydrous potassium acetate, 50 ml. of glacial acetic acid and .25 ml. of acetic anhydride were mixed and refluxed for 3.5 days. The product was diluted with 200 ml. of pentane, filtered and washed with 50 ml. of saturated sodium chloride solution. The product was then washed until neutral and dried over anhydrous calcium sulphate. The product was distilled to give bis - (gamma - acetoxypropyl)tetramethyldisiloxane

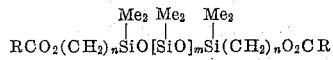

in 84% yield. This material had the following properties: B. P. 112–115° C. at .4 mm., $n_D^{20}$ 1.4343, $d^{20}$ .976 and MR$_D$ 89.34. Upon analysis the material was found to contain 16.9% silicon and to have a saponification equivalent of 172.

Example 3

499 g. of bis - (gamma - acetoxypropyl)tetramethyldisiloxane, 147.7 g. of octamethylcyclotetrasiloxane and 14.5 ml. of concentrated sulphuric acid were mixed and stirred for 20 hours. 50 ml. of water was added and the mixture was stirred for 15 minutes. 144 g. of benzene were added and the aqueous layer was separated and washed three times with benzene. The benzene solutions were combined and distilled to give the following products having the formula

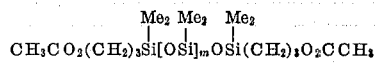

where $m$ has the values shown below.

| $n$ | B. P., ° C. at .5 mm. | $n_D^{20}$ | $d^{20}$ | MR$_D$ | Saponification Equivalent | Percent Si |
|---|---|---|---|---|---|---|
| 1 | 130 to 131 | 1.4294 | .979 | 107.73 | 205 | 20.8 |
| 2 | 144 to 149 | 1.4260 | .978 | 126.49 | 246 | 23.6 |
| 3 | 154 to 158 | 1.4244 | .978 | 145.44 | 268 | 24.9 |

Example 4

470 g. of phosphorus tribromide was added over a period of two hours to 470 g. of 4-hydroxybutyltrimethyl silane. The reaction mixture was stirred and cooled in an ice-salt bath during the addition. The temperature was gradually increased over a period of 36 hours until it reached 105° C. The reaction mixture was cooled and poured onto ice. Approximately 300 cc. of pentane were added. The organic layer was washed with water and then twice with 100 cc. portions of aqueous potassium carbonate. The solution was dried with magnesium sulphate and fractionated to give 627 g. of 4 - bromobutyltrimethylsilane, B. P. 85° C. at 26 mm. and having a refraction index at 20° C. of 1.4551.

147 g. of 4 - bromobutyltrimethylsilane was added over a period of 5 minutes with stirring to 560 g. of concentrated sulphuric acid. During the addition the reaction mixture was cooled to 12° C. After two hours the evolution of methane had stopped. The reaction mixture was then poured on cracked ice and 100 cc. of ether was added and the organic layer separated. The aqueous layer was extracted 3 times with 100 cc. portions of ether and the combined extracts were washed with aqueous sodium bicarbonate and dried over anhydrous calcium chloride for 5 hours. Upon distillation the compound bis - (4 - bromobutyl)tetramethyldisiloxane having a B. P. of 146 to 147° C. at 1.7 mm. was obtained. This compound had a molar refraction of 91.97.

*Example 5*

510 g. of bis - (4 - bromobutyl)tetramethyldisiloxane, 380 g. of anhydrous potassium acetate, 500 cc. of glacial acetic acid and 20 cc. of acetic anhydride were mixed and heated to a reflux temperature of 149° C. to 150° C. for 62 hours. The mixture was cooled and 200 cc. of pentane were added. The solution was filtered, washed with 400 cc. of saturated sodium chloride solution and then with dilute aqueous sodium bicarbonate solution until it was neutral. The solution was dried over anhydrous magnesium sulphate and then distilled to give 415 g. of bis - (4 - acetoxybutyl) - tetramethyldisiloxane, B. P. 161° C. at 2 mm. pressure and having a refractive index at 21° C. of 1.4360.

*Example 6*

480 g. of bis - (4 - acetoxybutyl)tetramethyldisiloxane, 98.3 g. of octamethylcyclotetrasiloxane and 13 ml. of concentrated sulphuric acid were mixed and stirred at room temperature for 15½ hours. 45 ml. of water were then added. The organic layer was separated, washed until neutral and then dried over calcium chloride. Upon distillation a series of compounds having the formula

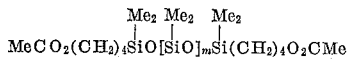

in which $m$ has the values shown below, were obtained.

| $m$ | B. P. in °C. at 6 mm. | $n_D^{20}$ |
|---|---|---|
| 1 | 190 | 1.4320 |
| 2 | 206 | 1.4285 |
| 3 | 220 | 1.4260 |
| 4 | 230 | 1.4240 |

A distillation residue was obtained which was composed of compounds in which $m$ has a value greater than 4.

*Example 7*

When the compound Me₃Si(CH₂)₅Br is cleaved with H₂SO₄ in the manner of Example 1, the product

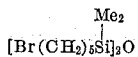

is obtained. When this material is reacted with potassium stearate in the manner of Example 2 the compound

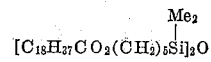

is obtained.

That which is claimed is:
1. A compound of the formula

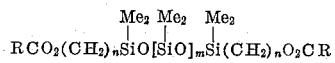

where R is a monovalent hydrocarbon radical, $n$ is an integer from 3 to 18 and $m$ has a value of at least one.

2.

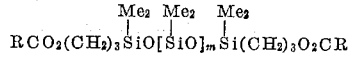

where R is a monovalent hydrocarbon radical and $m$ has a value of at least 1.

3.

4.

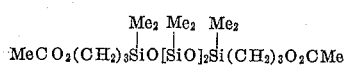

5.

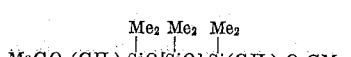

6.

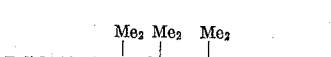

where R is a monovalent hydrocarbon radical and $m$ has a value of at least 1.

7.

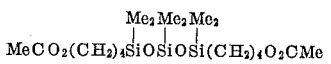

8.

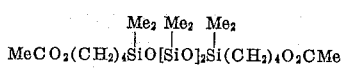

References Cited in the file of this patent

UNITED STATES PATENTS 2,527,591  Speier _____ Oct. 31, 1952